Figure 1:
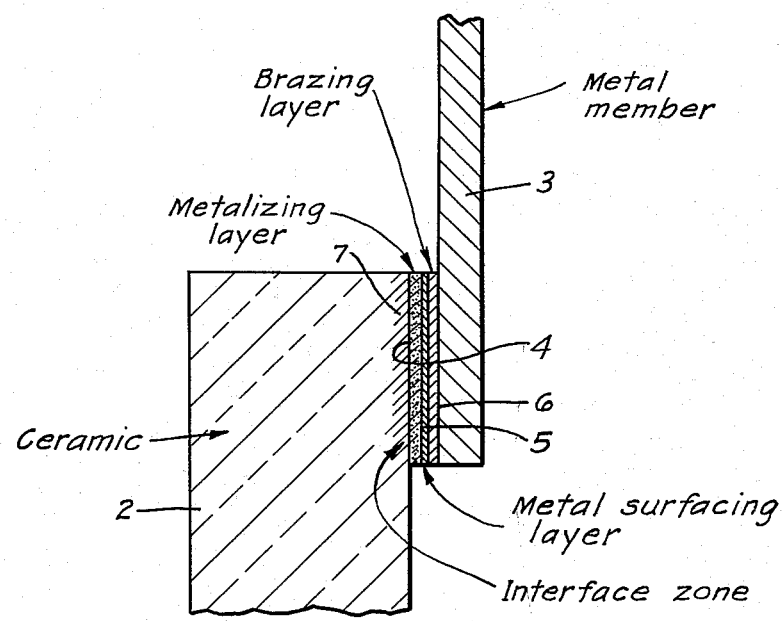

INVENTORS
James R. Welch
Paul D. Williams

BY Harold E. Sorg

ATTORNEY

United States Patent Office 2,996,401
Patented Aug. 15, 1961

2,996,401
METHOD OF MAKING CERAMIC STRUCTURES FOR ELECTRON TUBES
James R. Welch, South San Francisco, and Paul D. Williams, Menlo Park, Calif., assignors to Eitel-McCullough, Inc., Bruno, Calif., a corporation of California
Filed Sept. 30, 1955, Ser. No. 537,719
7 Claims. (Cl. 117—22)

This invention relates to ceramic structures for electron tube envelopes, and more particularly to vacuum-tight joints involving such ceramic structures. The invention is especially concerned with the vacuum problem because, unless the joint of an electron tube envelope is tight enough to exclude air, the joint is of no practical use.

It is now generally recognized by the vacuum tube industry that ceramic insulating material has many properties which recommended its use in the fabrication of tube envelopes. In particular, it is the mechanical strength and ability to withstand high temperatures that make ceramics superior to glass in the fabrication of tube envelopes. The main reason why ceramics have not been used to a greater extent in the past to replace glass in tube envelopes is that considerable difficulty has been experienced in developing a satisfactory method for joining ceramic sections to adjacent metal portions of the tube or to other ceramic sections. The problem is aggravated by the fact that not only must the joints in the tube envelope have high mechanical strength but they must also be vacuum-tight. In order to solve this problem, various processes for metalizing the surface of a ceramic body have been proposed. One of the more successful metalizing processes heretofore proposed is the process described in the patent to H. J. Nolte, No. 2,667,427, in which a metalizing composition containing molybdenum and manganese is fired on the ceramic.

The present invention provides an improvement over the molybdenum-manganese process described in the Nolte Patent No. 2,667,427. For example, the metalizing composition used in the present invention includes titanium in addition to the molybdenum and manganese suggested by Nolte. Although the molybdenum-manganese mixture probably provided the best metalizing composition prior to this invention, the addition to titanium is a substantial improvement and results in a general increase in the yield of high-strength vacuum-tight seals.

Among the principal objects of the invention is the provision of an improved production technique which will render more practical the use of ceramics in the fabrication of tube envelopes.

Another object of the invention is to provide a metalizing process which produces a metalizing layer that is firmly bonded to the ceramic.

A further object of the invention is to provide an improved method of metalizing ceramics with a firmly adhering metallic coating.

The invention possesses other objects and features of advantage, some of which, with the foregoing, will be set forth in the following description of the invention. It is to be understand that the invention is not limited to the disclosed species, as variant embodiments thereof are contemplated and may be adopted within the scope of the claims.

Figure 2:
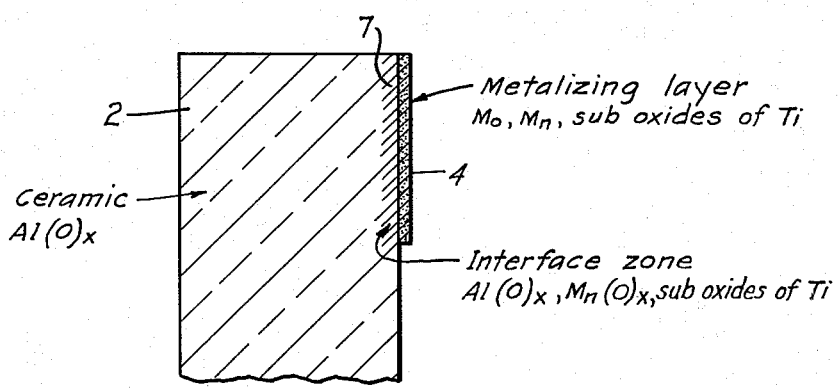

Referring to the drawings:

FIGURE 1 is a sectional view of a metalized ceramic structure embodying the principles of the invention and showing the various layers of material which form the bond between the ceramic and metal members of the structure; and, FIGURE 2 is a sectional view showing a metalized ceramic member after firing and indicating the principal constituents of the ceramic and the metalizing layer. The principal constituents believed to exist in the interface zone are also indicated.

Referring in more detail to the drawings, FIGURE 1 indicates a portion of a ceramic structure such as is used in a tube envelope. The structure comprises a ceramic section 2 which is joined to a metal member 3 by means of a metalizing layer 4, a metal surfacing layer 5, and a brazing layer 6. The ceramic section 2 may be one of the ceramic bodies commonly used in the electronic industry. Alumina ceramics are preferred, and that is the type depicted in FIGURE 2. More specifically, it has been found that the best results are obtained with high alumina ceramics, that is, ceramics containing at least 85% alumina. It should be understood that in the drawings the thicknesses of the various layers have been enlarged for clarity and do not represent actual dimensions. It should also be understood that the metal member 3 may be solid metal or a second metalized ceramic section.

In its preferred form metalizing layer 4 is prepared by mixing powdered manganese and titanium with a powdered metal selected from the group consisting of molybdenum and tungsten. The metals can be used in the powdered mixture in various forms. For example, the titanium, manganese, and molybdenum or tungsten can each be used in elemental form or in one of their oxide forms. The titanium can also be used in the form of titanium hydride. Among the various combinations which are thus possible, the following three mixtures have been found to be particularly effective: One consists of titanium hydride, manganese in elemental form, and molybdenum or tungsten in elemental form; another consists of an oxide of titanium, such as titanium dioxide, an oxide of manganese, such as manganese dioxide, and an oxide of molybdenum or tungsten, such as molybdenum trioxide or tungsten trioxide; and the third consists of an oxide of titanium, such as titanium dioxide, an oxide of manganese, such as manganese dioxide, and molybdenum or tungsten in elemental form. In general, molybdenum is the preferred member of the molybdenum-tungsten group and is the member which is depicted in FIGURE 2.

The metal powders are mixed as by ball-milling in a suitable carrier such as acetone, methyl amyl acetate, or mixtures thereof, preferably with a suitable binding agent such as nitrocellulose. The resulting composition is brushed, sprayed, printed or otherwise applied to the desired area of the ceramic. The coated ceramic is then fired in an atmosphere furnace. A reducing atmosphere is desirable, and commercial hydrogen has been found to be satisfactory for this purpose. The temperature in the furnace should be at least as high as the sintering temperature of the metalizing mixture and below the softening point of the ceramic. For example, excellent results have been obtained by firing the coated ceramic at a temperature of 1425° C. for about thirty minutes.

The exact nature of the bonding action between the metalizing composition and the ceramic is not known with certainty, but it is believed that the metalizing composition forms new crystalline structures with the ceramic to produce the interface zone 7. Thus, it is thought that the bonding action is chemical in nature rather than a mere mechanical gripping. It seems likely that a mere mechanical action would not account for the high strength and vacuum tightness of the seals obtained with the metalizing composition of this invention. In theory it would seem that it is the oxidized forms of the metals in the fired composition which penetrate the ceramic to form the interface zone. Since titanium is very easily oxidized, this theory would explain the beneficial effects of the titanium in the mixture. In addition to the oxides of titanium, it is believed that oxides of the manganese also appear in the interface zone, but it is doubted that the molybdenum or tungsten appear in oxide form in any appreciable extent after firing.

FIGURE 2 shows a metalized ceramic body and indicates the principal constituents believed to exist in the interface zone 7. These constituents are aluminum and manganese, probably in one of their oxide forms, and titanium, probably in the form of suboxides. The metalizing layer 4 is known to contain titanium and manganese and molybdenum or tungsten, whichever is used in the mixture. The molybdenum or tungsten and the manganese appear in elemental form, and the titanium appears in suboxide form. When the titanium is added to the mixture as titanium hydride, the action and end form of the titanium are basically the same as previously described. The reason is that the titanium hydride disassociates at temperatures well below the firing temperature, so that by the time the coated ceramic reaches firing temperature the hydrogen has been evolved, leaving the titanium free to become oxidized.

The relative percentages of the titanium, manganese, and molybdenum or tungsten in the dry powder mixture are not critical within certain limits. The limits for titanium are a maximum of about 25% and a minimum of about 1%. Above about 25%, there is too much interaction between the titanium and the ceramic, which results in weakening of the ceramic at the interface zone; and below about 1%, there is not enough interaction. The optimum amount of titanium is about 4%. It is desirable to maintain the percentage of molybdenum or tungsten and the percentage of manganese in the ratio of about 4 to 1, regardless of change in the amount of titanium. Accordingly, a formula for the dry powder mixture based on the preferred ratio of molybdenum or tungsten to manganese can be expressed as:

$$X\% \text{ Mn} + 4X\% \text{ Mo or W} + Y\% \text{ Ti} = 100\%$$

By selecting a value for Y within the mentioned limits of 1% to 25%, the relative value for X can be calculated. For example, the overall optimum mixture is about 4% titanium, 19% managanese, and 77% molybdenum. It should be noted that when the value which is selected for Y does not result in even numbers for X and 4X, these latter figures can safely be rounded to even numbers, because the relationship is not that critical. If the minimum of 1% titanium is used, the other constituents of the dry mixture would be about 20% manganese and 79% molybdenum or tungsten. Similarly, if the maximum of 25% titanium is used, the other constituents would be about 15% manganese and 60% molybdenum or tungsten. Since the various percentages are not critical within narrow limits, the percentage figures previously discussed are appropriate regardless of the form in which the various metals are used in the dry mixture, for example, elemental form, oxides, or, in the case of titanium, hydride form.

It will be seen that if the percentage of molybdenum or tungsten and the percentage of manganese are maintained in the preferred ratio of about 4 to 1, then the manganese varies between 15%, at 25% titanium, and 20%, at 1% titanium. Although the best results are obtained with this range of manganese, metalizing can be obtained with manganese ranging from 10% to 40%. However, when the high end of the manganese range is used, it should only be used with the low end of the titanium range, so that the major constituent is always molybdenum or tungsten.

After the ceramic body has been metalized in the previously described manner, the metalizing layer 4 is preferably coated as by electroplating with a surfacing layer 5 of a metal such as nickel or copper. Finally, the metal surfacing layer is hard-soldered to the metal member 3 by the brazing layer 6 of copper-silver eutectic alloy or the like. The brazing is accomplished in a suitable brazing furnace at a temperature of about 825° C. In this furnace operation the metal surfacing layer 5 is also sintered to metalizing layer 4. Surfacing layer 5 may be omitted and the member 3 brazed directly to metalizing layer 4. The presence of metal layer 5 is much superior, however, because it provides a surface of solid metal to which member 3 may be more tightly brazed.

Having thus described the invention, what is claimed as new and desired to be secured by Letters Patent is:

1. The method of metalizing a ceramic body for an electron tube to provide a surface suitable for bonding to a metal or metalized body to form between the two bodies a vacuum tight joint of high mechanical strength, which comprises coating the ceramic with a mixture of metal powders including 1% to 25% by weight of titanium, 40% to 10% by weight of manganese and a major proportion by weight of metal in the group consisting of molybdenum and tungsten, and then firing the coated ceramic in a reducing atmosphere at a temperature at least as high as the sintering temperature of the mixture.

2. The method of metalizing a ceramic body for an electron tube to provide a surface suitable for bonding to a metal or metalized body to form between the two bodies a vacuum tight joint of high mechanical strength, which comprises coating the ceramic with a mixture of metal powders including 1% to 25% by weight of titanium in hydride form, 40% to 10% by weight of manganese in elemental form and a major proportion by weight of metal in the group consisting of molybdenum in elemental form and tungsten in elemental form, and then firing the coated ceramic in a reducing atmosphere at a temperature at least as high as the sintering temperature of the mixture.

3. The method of metalizing a ceramic body for an electron tube to provide a surface suitable for bonding to a metal or metalized body to form between the two bodies a vacuum tight joint of high mechanical strength, which comprises coating the ceramic with a mixture of metal powders including 1% to 25% by weight of titanium in oxide form, 40% to 10% by weight of manganese in oxide form and a major proportion by weight of metal selected from the group consisting of molybdenum in oxide form and tungsten in oxide form, and then firing the coated ceramic in a reducing atmosphere at a temperature at least as high as the sintering temperature of the mixture.

4. The method of metalizing a ceramic body for an electron tube to provide a surface suitable for bonding to a metal or metalized body to form between the two bodies a vacuum tight joint of high mechanical strength, which comprises coating the ceramic with a mixture of metal powders including 1% to 25% by weight of titanium in oxide form, 40% to 10% by weight of manganese in oxide form and a major proportion by weight of metal selected from the group consisting of molybdenum in elemental form and tungsten in elemental form, and then firing the coated ceramic in a reducing atmosphere at a temperature at least as high as the sintering temperature of the mixture.

5. The method of metalizing a ceramic body for an electron tube to provide a surface suitable for bonding to a metal or metalized body to form between the two bodies a vacuum tight joint of high mechanical strength, which comprises coating the ceramic with a mixture of metal powders including titanium, manganese and a major proportion by weight of metal in the group consisting of molybdenum and tungsten, and then firing the coated ceramic in a reducing atmosphere at a temperature at least as high as the sintering temperature of the mixture, said titanium comprising between 1% and 25% by weight of said mixture of metal powders and said manganese comprising between 40% and 10% by weight of said mixture of metal powders.

6. The method of metalizing a ceramic body for an electron tube to provide a surface suitable for bonding to a metal or metalized body to form between the two bodies a vacuum tight joint of high mechanical strength, which comprises coating the ceramic with a mixture of metal powders including titanium, manganese and a major proportion by weight of metal in the group consisting of molybdenum and tungsten, and then firing the coated ceramic in a reducing atmosphere at a temperature at least as high as the sintering temperature of the mixture, said titanium comprising between 1% and 25% by weight of said mixture of metal powders, and the amount of the metal selected from said group being substantially four times the amount of manganese in said mixture.

7. The method of metalizing a ceramic body for an electron tube to provide a surface suitable for bonding to a metal or metalized body to form between the two bodies a vacuum tight joint of high mechanical strength, which comprises coating the ceramic with a mixture of metal powders consisting of substantially 4% by weight of titanium, substantially 19% by weight of manganese and substantially 77% by weight of a metal in the group consisting of molybdenum and tungsten, and then firing the coated ceramic in a reducing atmosphere at a temperature at least as high as the sintering temperature of the mixture.

References Cited in the file of this patent

UNITED STATES PATENTS

| | | |
|---|---|---|
| 2,163,407 | Pulfrick | June 20, 1939 |
| 2,447,379 | Wenger | Aug. 17, 1948 |
| 2,570,248 | Kelley | Oct. 9, 1951 |
| 2,590,893 | Sanborn | Apr. 1, 1952 |
| 2,647,218 | Sorg et al. | July 28, 1953 |
| 2,667,427 | Nolte | Jan. 26, 1954 |
| 2,667,432 | Nolte | Jan. 26, 1954 |
| 2,715,593 | Clark | Apr. 16, 1955 |
| 2,739,375 | Coxe | Mar. 27, 1956 |
| 2,763,919 | Kempe et al. | Sept. 25, 1956 |
| 2,776,472 | Mesick | Jan. 8, 1957 |
| 2,780,561 | LaForge | Feb. 5, 1957 |
| 2,798,577 | LaForge | July 9, 1957 |
| 2,857,663 | Beggs | Oct. 28, 1958 |
| 2,857,664 | Luks et al. | Oct. 28, 1958 |

FOREIGN PATENTS

| | | |
|---|---|---|
| 138,506 | Australia | Aug. 28, 1950 |
| 141,966 | Australia | July 4, 1951 |